(12) United States Patent
Bell et al.

(10) Patent No.: US 6,791,073 B1
(45) Date of Patent: Sep. 14, 2004

(54) OPTICAL RECEIVER HAVING BAFFLE INCLUDING A PLURALITY OF APERTURES

(75) Inventors: John A. Bell, Issaquah, WA (US); John J. Schuster, Bellevue, WA (US)

(73) Assignee: Terabeam Corporation, Redmond, WA (US)

( * ) Notice: Subject to any disclaimer, the term of this patent is extended or adjusted under 35 U.S.C. 154(b) by 614 days.

(21) Appl. No.: 09/746,700

(22) Filed: Dec. 21, 2000

(51) Int. Cl.⁷ .............................................. H01L 31/00
(52) U.S. Cl. ............................ 250/214.1; 250/214 AL; 250/227.11
(58) Field of Search ..................... 250/214.1, 214 AL, 250/227.11, 227.14, 216, 201.3; 455/428, 151.2; 398/128, 130, 133, 134, 212, 214

(56) References Cited

U.S. PATENT DOCUMENTS 6,137,535 A  * 10/2000  Meyers ....................... 348/340

* cited by examiner

*Primary Examiner*—Que T. Le
(74) *Attorney, Agent, or Firm*—Blakely Sokoloff Taylor & Zafman LLP

(57) ABSTRACT

A baffle containing a plurality of small apertures is mounted on the receiver aperture of an optical receiver, such as a wireless optical telecommunication system receiver. The baffle attenuates ambient radiation that may interfere with the optical receiver. The baffle includes a plurality of apertures that have their axes substantially parallel to the optical axis of the receiver.

27 Claims, 3 Drawing Sheets

OPTICAL RECEIVER HAVING BAFFLE INCLUDING A PLURALITY OF APERTURES

TECHNICAL FIELD OF THE INVENTION

The present invention relates generally to a receiver used in wireless telecommunication systems, and more particularly, relates to a receiver that has a honeycomb baffle to reduce ambient light.

BACKGROUND OF THE INVENTION

A typical optical wireless telecommunications system comprises an optical transmitter and an optical receiver, with associated electronics to modulate and demodulate data on a light beam. Often, receivers are basically telescopes.

An example of a configuration of a typical optical receiver is shown at 10 in FIG. 1. The optical receiver 10 comprises a cylindrical receiver tube 12 with a receiver aperture 15, (sometimes made of glass), at one end, and a system of internal mirrors 20 and 18 to collect and focus light to a small optical detection unit 22. In this optical receiver 10, a light beam 16 (the data communication signal) enters the receiver tube 12 at a receiver aperture 15. The mirrors 18 and 20 focus the light beam 16 onto a small area at detection unit 22. An example of such a traditional system is a Cassegrain telescope with detector electronics located at the focal plane.

The optical receivers used in wireless optical communication systems are often required to operate under varying background illumination conditions, i.e., at night or under direct sunlight. Most problems occur when the optical receiver is operating in direct sunlight, particularly where sunlight is entering the receiver aperture 15 at an angle close to that of the data communication signal 16. Several potential problems are caused by this situation. First, the photo-detector may be saturated with incident sunlight. Second, the optical system will be heated resulting in thermal gradients and mechanical deformation. Third, the optical system may produce unwanted images of the sun that lead to unsafe external heating or a blinding effect.

The first two problems only affect performance or internal damage of the optical receiver 10. The third problem is a more serious concern since it relates to safety at the deployment site of the optical receiver. One situation where this problem is known to exist is in a conventional Cassegrain 2-mirror telescope, as described above in relation to FIG. 1. In this case, when ambient light enters the receiver aperture 15 slightly off-axis, so that some light reflected from the primary mirror 20 does not subsequently strike the secondary mirror 18, there is an image produced at the focal plane of the primary mirror. Depending on the field angle of the incident light and the particular optical design of the telescope system, non-vignetted transmission to this image can be substantial. In the case of the off-axis illumination being sunlight, an absorbing surface placed at the prime-focus image can become dangerously hot.

Conventional approaches to mitigate the problem described above include: (1) incorporating a baffle aperture that limits the field of view of the optical receiver 10, (2) placing a band-pass filter in front of the receiver aperture 15 to reject wavelengths that are not required, or (3) only use the receiver 10 at night. The third option is clearly not acceptable for a robust communication service application. The second option is impractical in some situations due to the high cost associated with large area wavelength selective filters. Also, in the case of the communication wavelength being invisible (in the near infrared for example), the external prime-focus light can be invisible but still contain significant energy.

The baffle approach can also be impractical. If light that enters a telescope with aperture diameter of D at angles of or greater is to be rejected by the baffle, the baffle needs to be placed a distance D/tan( ) in front of the entrance aperture. For example, if D is 0.4 meters and is 5 degrees, the baffle needs to be 4.6 meters in front of the aperture. If this is accomplished by a baffle tube, the system becomes very large and unwieldy.

SUMMARY OF THE INVENTION

A baffle containing a plurality of small apertures is mounted on the receiver aperture of an optical receiver, such as a wireless optical telecommunication system receiver. The baffle attenuates ambient radiation that may interfere with the optical receiver. The baffle includes a plurality of apertures that have their axes substantially parallel to the optical axis of the receiver. The depth of the baffle assembly is smaller than a single baffle by the ratio of the small aperture diameter to the full receiver aperture diameter. Honeycomb core material is a practical embodiment of such a multi-aperture baffle.

BRIEF DESCRIPTION OF THE DRAWINGS

Non-limiting and non-exhaustive embodiments of the present invention will be described in the following figures, wherein like reference numerals refer to like parts throughout the various views unless otherwise specified.

DETAILED DESCRIPTION OF THE ILLUSTRATED EMBODIMENTS

Embodiments of a system and method for using a honeycomb baffle in a wireless telecommunication system receiver are described in detail herein. In the following description, numerous specific details are provided to provide a thorough understanding of embodiments of the invention. One skilled in the relevant art will recognize, however, that the invention can be practiced without one or more of the specific details, or with other methods, materials, components, etc. In other instances, well-known structures, materials, or operations are not shown or described in detail to avoid obscuring aspects of various embodiments of the invention. Furthermore, it is understood that the various embodiments shown in the figures are illustrative representations, and are not necessarily drawn to scale.

Reference throughout this specification to "one embodiment" or "an embodiment" means that a particular feature, structure, material, or characteristic described in connection with the embodiment is included in at least one embodiment of the present invention. Thus, the appearances of the phrases "in one embodiment" or "in an embodiment" in various places throughout this specification are not necessarily all referring to the same embodiment Furthermore, the particular features, structures, materials, or characteristics may be combined in any suitable manner in one or more embodiments.

Figure 3:
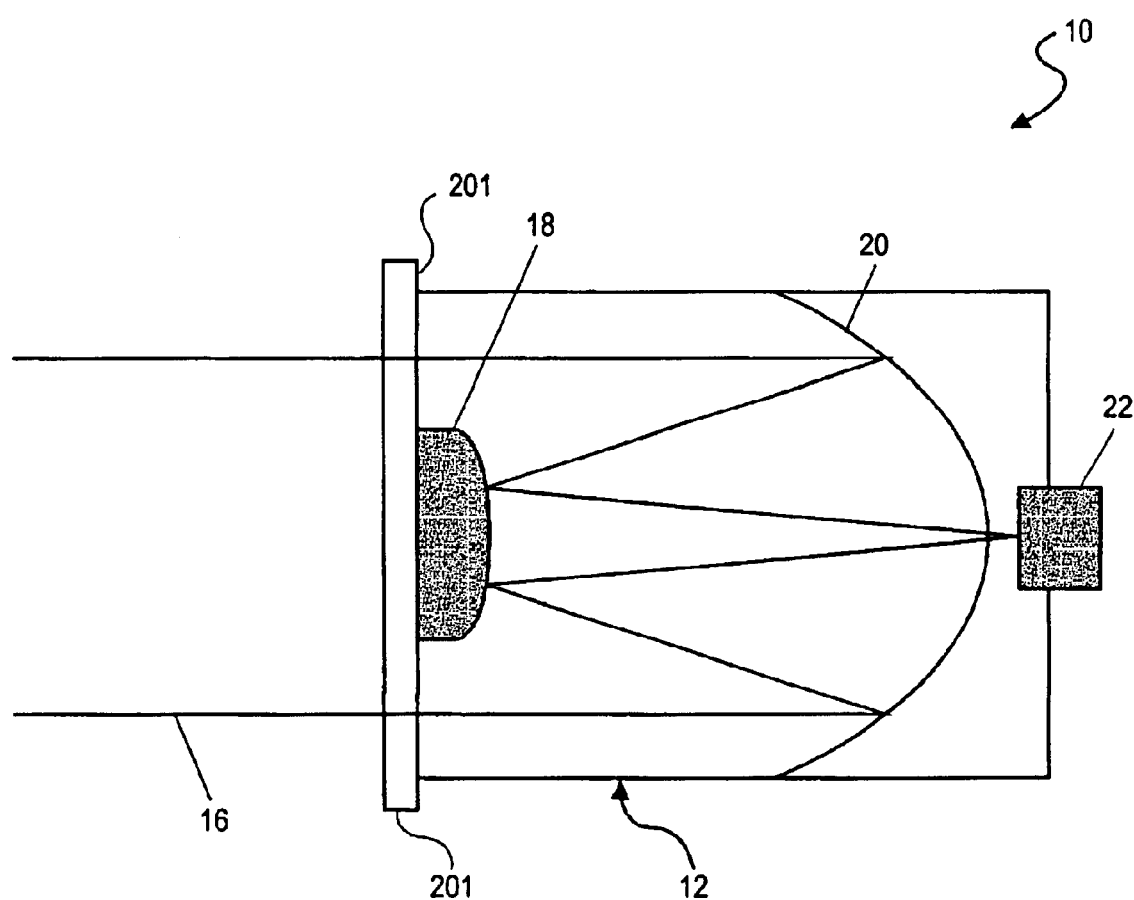
FIG. 3 is a functional block diagram showing an optical receiver system formed in accordance with the present invention.

In accordance with one embodiment of the present invention, as seen in FIG. 3, a baffle 201 is attached to the receiver aperture 15 of the optical receiver 10. The baffle 201 has a depth D and is of sufficient size and shape to cover the entire receiver aperture 15. The attachment of the baffle 201 to the optical receiver 10 may be accomplished by any number of mechanical means. For example, in one embodiment, the baffle 201 is attached to a transparent pane of glass that is then secured to the optical receiver 10. This method reduces any attenuation of a light beam 16 by the mounting mechanism. In an embodiment, light beam 16 is a data communications signal.

Figure 1:
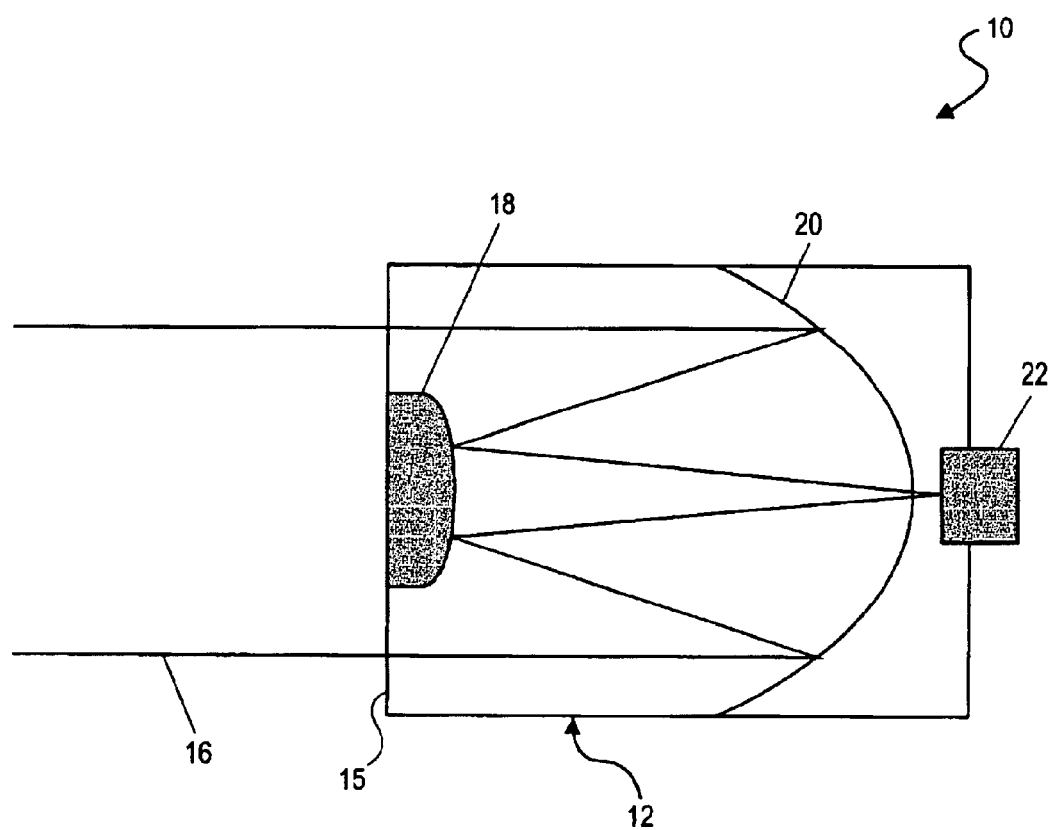
FIG. 1 is a functional block diagram showing a prior art optical receiver system.
Figure 2:
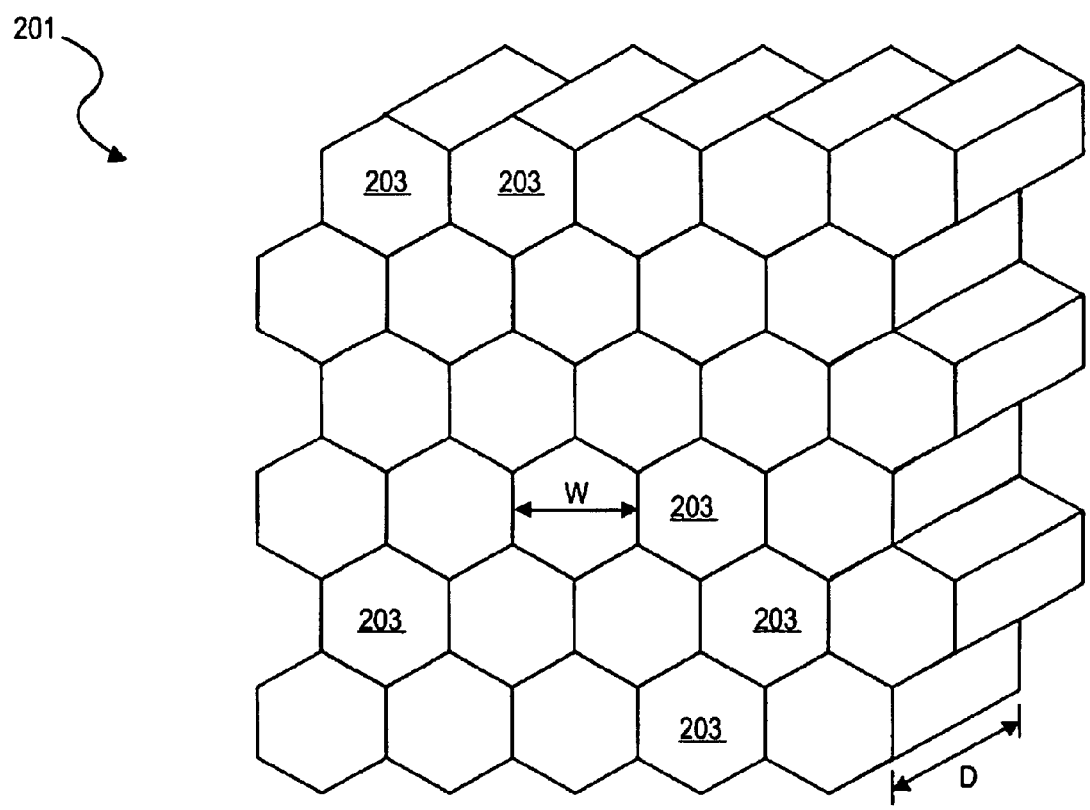
FIG. 2 is a perspective view of a section of a baffle formed in accordance with the present invention.

Turning to FIG. 2, in one embodiment, the baffle 201 is comprised of a plurality of periodically and uniformly distributed small apertures 203. In one embodiment, the small apertures 203 are hexagonal in shape. In alternative embodiments, the small apertures 203 may be triangular, rectangular, circular, pentagonal or any convenient shape. In one embodiment the shape used for the small apertures 203 may be amenable to periodic and uniform arrangement with reduced interstitial space between the apertures 203. In one embodiment, all of the small apertures 203 are of the same size and shape and are arranged uniformly and periodically. However, in other embodiments, the small apertures may have varying size and shape and depth D across the aperture of the optical receiver 10. This may be advantageous to minimize weight, improve packaging or to change the aesthetics.

As seen in FIG. 2, in one embodiment, the small apertures 203 have a depth D that is uniform for each of the small apertures 203. Also, each of the small apertures 203 have their longitudinal axes substantially parallel to each other and are formed to be identical to each other in shape and width W. As noted above, the depth D of the small apertures 203 may vary across the aperture in alternative embodiments.

By placing the baffle 201 on the receiver aperture 15, ambient incident light at incident angles close to that of light beam 16 can be attenuated. Moreover, the depth D of the baffle 201 can be reduced compared to the prior art. As an example, by dividing a 0.4 meter diameter optical aperture mentioned above into small apertures 203 that are 2 mm in width W, baffle tubes with a +/−5 degree field of view are 23 mm in depth D. Thus, the depth of the baffle tube is reduced by the ratio of the small aperture 203 width W to the full receiver aperture diameter (1/200 in this example). It can be appreciated that by using the baffle 201 of the present invention, significant size advantages can be gained over the prior art. Moreover, depending upon the design requirements, the depth D of the baffle 201 and the width W of the small apertures 203 can be adjusted to provide attenuation closer to or further away from the optical axis, as the environment dictates.

In one embodiment, the baffle 201 hexagonal honeycomb core is formed from aluminum. This honeycomb structure is readily available from any number of manufacturers in various honeycomb sizes and depths. For the purposes of a baffle used in an optical receiver 10, each cell of the honeycomb serves as a small aperture 203, and light that enters the cell away from normal incidence strikes the wall of the cell and is attenuated. At an angle calculated as described above, all light that enters the honeycomb core panel strikes the cell walls, and no direct transmission is allowed.

In one embodiment, the longitudinal axes of the small apertures 203 of the baffle 201 should be substantially parallel to the optical axis of the optical receiver 10. If the axes are not coaxial, some of light beam 16 will be lost by the obscuration of the baffle 201. For example, if the baffle 201 is designed to block light that is incident at 5 degrees off axis, and the baffle 201 is misaligned from the optical receiver axis by 2.5 degrees, then half of the on-axis light (of light beam 16) would be lost.

Further, the walls separating the small apertures 203 will have some discrete thickness that will lead to partial obscuration of light beam 16. In one embodiment the thickness of the walls between the small apertures is reduced to reduce obscuration of light beam 16. Thus, the use of aluminum is advantageous because of its high strength to weight ratio and low cost. Of course, other materials such as titanium or graphite may also be used.

The use of the small apertures 203 will cause diffraction of light beam 16. The diffraction will tend to distort and corrupt light beam 16. However, by keeping the small apertures 203 relatively large compared to the wavelength of light beam 16, diffraction effects can be controlled.

In operation, light beam 16 is a light signal sent from an optical transmitter system (not shown), having data modulated thereon. According to an embodiment, light beam 16 can comprise laser light and the like, having a wavelength of 1548.51 nm, for example. Light beam 16 is not limited to being monochromatic or to any particular wavelength or color, and may include visible light as well as ultraviolet or infrared portions of the spectrum.

The detection unit 22 can form part of an optical processing unit that includes photodetectors (such as avalanche photodiodes, PIN detectors, or other such detectors or photosensitive devices, for example), processors, modulators/demodulators, and other electronic logic and electronic circuitry to extract and process the data carried by light beam 16.

Because light beam 16 is nominally propagating along the optical axis of the optical receiver 10, the baffle 201 has relatively little effect on light beam 16. Light beam 16 can then be freely received, reflected, focused, and the like by the optical receiver 10 onto the detection unit 22. Thus, the baffle 201 can be used on any type of optical receiver 10 without regard to the optical receiver's internal workings.

The above description of the baffle 201 has been provided in connection with a mirror-based optical receiver 10. However, the baffle 201 may also be applied to a refractive or holographic optical system, such as that described in pending U.S. patent application Ser. No. 09/627,815 entitled "SYSTEM AND METHOD FOR USING A HOLOGRAPHIC OPTICAL ELEMENT IN A WIRELESS TELECOMMUNICATION SYSTEM RECEIVER" filed Jul. 28, 2000 to Amadon et al., assigned to the same assignee as the present invention and herein incorporated by reference in its entirety.

Thus, the above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. For example, while some embodiments of the receiver system have been described as using mirrors and/or beam splitters having specific orientations, it is understood that other embodiments may not include these components or that other embodiments may have other configurations or orientations.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A receiver, comprising:
    a receiver aperture for gathering a data communication signal;
    a mirror system for focusing said data communication signal;
    an optical processing unit to receive the focused data communication signal;
    and a baffle disposed near said receiver aperture, said baffle comprised of a plurality of apertures that serve as a conduit for said data communication signal.

2. The receiver of claim 1 wherein the baffle comprises aluminum.

3. The receiver of claim 1 wherein said plurality of apertures are hexagonal, triangular, rectangular, circular, or pentagonal.

4. The receiver of claim 1 wherein said plurality of apertures are periodically and uniformly distributed.

5. The receiver of claim 1 wherein said plurality of apertures have longitudinal axes substantially parallel to an optical axis of said optical receiver.

6. The receiver of claim 1 wherein said baffle is mounted onto a transparent material and wherein said transparent material is mounted onto said receiver.

7. The receiver of claim 1 wherein said plurality of apertures are of non-uniform size, shape, or depth.

8. A baffle, comprising:
    a plurality of apertures having longitudinal axes that are parallel to each other, said plurality of apertures serving as a conduit for a data communication signal to be received by an optical receiver.

9. The baffle of claim 8 wherein the baffle comprises aluminum.

10. The baffle of claim 8 wherein said plurality of apertures are hexagonal, triangular, rectangular, circular, or pentagonal.

11. The baffle of claim 8 wherein said plurality of apertures are periodically and uniformly distributed.

12. The baffle of claim 8 wherein said plurality of apertures have longitudinal axes substantially parallel to an optical axis of said optical receiver.

13. The baffle of claim 8 wherein said baffle is mounted onto a transparent material and wherein said transparent material is mounted onto said receiver.

14. The baffle of claim 8 wherein said plurality of apertures are of non-uniform size, shape, or depth.

15. An apparatus, comprising:
    a baffle disposed in a receiver unit, the baffle including a plurality of apertures having longitudinal axes that are parallel to each other, said plurality of apertures serving as a conduit for a data communication signal to be received by said receiver unit, the baffle positionable to face incident light rays and being capable of passing the incident light rays and attenuating ambient light rays.

16. The apparatus of claim 15 wherein the baffle comprises aluminum.

17. The apparatus of claim 15 wherein said plurality of apertures are hexagonal, triangular, rectangular, circular, or pentagonal.

18. The apparatus of claim 15 wherein said plurality of apertures are periodically and uniformly distributed.

19. The apparatus of claim 18 wherein said plurality of apertures have longitudinal axes substantially parallel to an optical axis of said receiver unit.

20. The apparatus of claim 15 wherein said baffle is mounted onto a transparent material and wherein said transparent material is mounted onto said receiver unit.

21. The apparatus of claim 15 wherein said plurality of apertures are of non-uniform size, shape, or depth.

22. A method, comprising:
    positioning a baffle of a receiver unit to face an incident light beam, wherein said baffle includes a plurality of apertures having longitudinal axes that are parallel to each other, said plurality of apertures serving as a conduit for a data communication signal to be received by said receiver unit.

23. The method of claim 22 wherein the baffle comprises aluminum.

24. The method of claim 22 wherein said plurality of apertures are hexagonal, triangular, rectangular, circular, or pentagonal.

25. The method of claim 22 wherein said plurality of apertures are periodically and uniformly distributed.

26. The method of claim 22 wherein said baffle is mounted onto a transparent material and wherein said transparent material is mounted onto said receiver unit.

27. The method of claim 22 wherein said plurality of apertures are of non-uniform size, shape, or depth.

* * * * *